United States Patent [19]

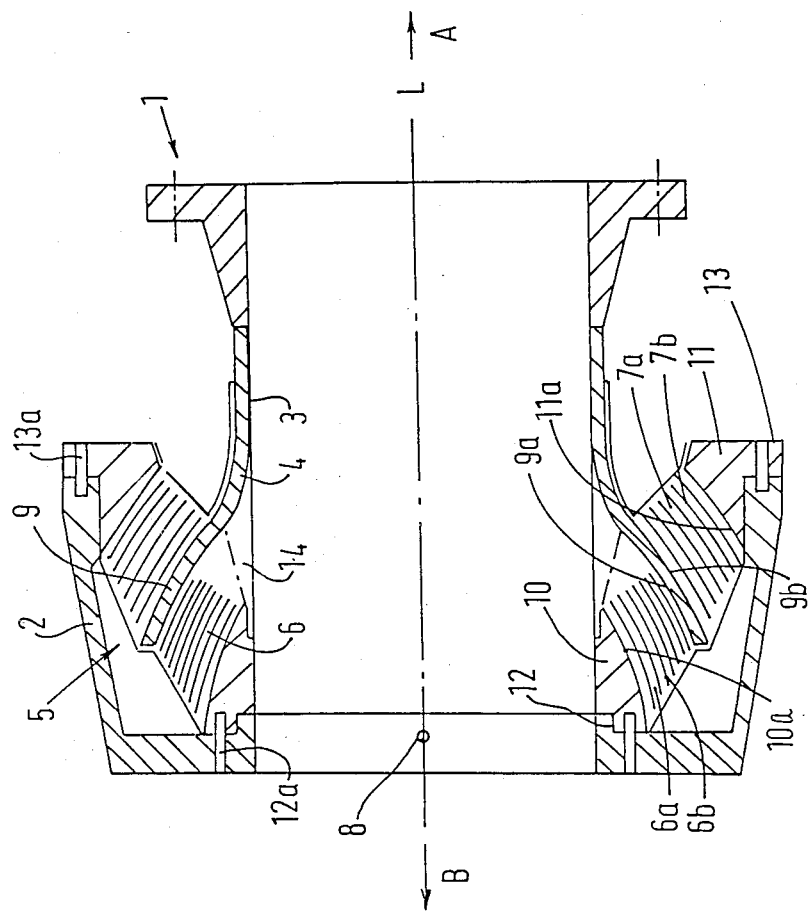

Moore

[11] Patent Number: 4,570,979
[45] Date of Patent: Feb. 18, 1986

[54] FLEXIBLE JOINT MEANS

[75] Inventor: Alan F. Moore, Burbage, England

[73] Assignee: Dunlop Limited, London, England

[21] Appl. No.: 499,864

[22] Filed: Jun. 1, 1983

[30] Foreign Application Priority Data

Jun. 10, 1982 [GB] United Kingdom ............... 8216919

[51] Int. Cl.[4] .............................................. F16L 27/10
[52] U.S. Cl. .................................. 285/223; 285/263; 285/49
[58] Field of Search ............... 285/263, 167, 223, 49, 285/51, 261

[56] References Cited

U.S. PATENT DOCUMENTS

| | | | |
|---|---|---|---|
| 3,504,903 | 4/1970 | Irwin | 285/263 X |
| 3,734,546 | 5/1973 | Herbert et al. | 285/234 X |
| 4,068,864 | 1/1978 | Herbert et al. | 285/49 X |
| 4,103,939 | 8/1978 | Herbert et al. | 285/49 X |
| 4,183,556 | 1/1980 | Schwemmer | 285/263 X |

Primary Examiner—Richard J. Scanlan, Jr.
Attorney, Agent, or Firm—Stevens, Davis, Miller & Mosher

[57] ABSTRACT

Flexible joint means for fluid conduits comprises an outer tubular member, an inner tubular member having an end portion positioned within the outer member and a bearing assembly acting between the outer and inner members. The bearing assembly comprises first and second bearings each of laminated construction comprising interleaving layers of elastomeric material and reinforcement material. The bearings are disposed on opposite sides of an annular collar associated with an inner member and act between the collar and a pair of axially spaced annular flanges associated with an outer member. Collar and flanges extend axially and radially such that one bearing is disposed radially inwards of the outer bearing. The radially inner bearing includes elastomeric material having a higher modulus of elasticity than the elastomeric material of the outer bearing such that the bearings have substantially similar axial stiffnesses.

24 Claims, 1 Drawing Figure

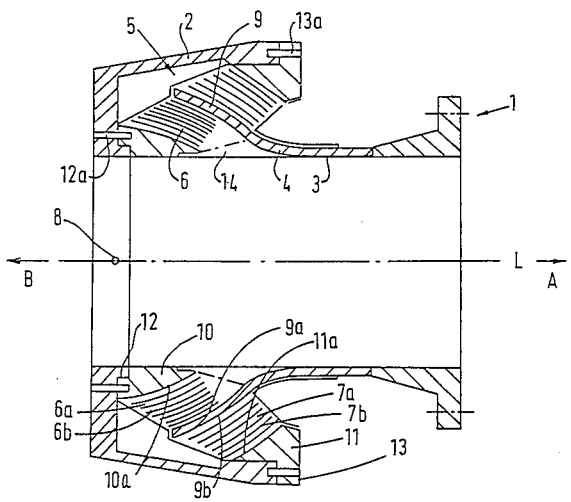

FLEXIBLE JOINT MEANS

This invention concerns improvements in or relating to flexible joint means and in particular, though not exclusively, to flexible joint means for fluid conduits.

According to the present invention flexible joint means comprises a rigid outer member having an opening therein, first and second radially inwardly extending annular flanges associated with the outer member, said flanges being spaced relative to one another along the longitudinal axis of the joint means, a rigid inner member having an end portion positioned within the opening in the outer member, a radially outwardly extending annular collar associated with the inner member, said collar being positioned between said first and second flanges, and first and second flexible annular bearings disposed on opposite sides of said collar and extending between said collar and said flanges so that in operation of the joint means one bearing is subjected to axial compression loads while the other bearing is subjected to axial tension loads and the first and second bearings are constructed and arranged to have substantially similar axial stiffnesses.

Preferably one or both bearings is/are of laminated construction comprising a plurality of layers of elastomeric material, e.g. rubber, interleaved with a plurality of layers of reinforcement material, e.g. metal, or fabric, fibreglass reinforced plastics and fibre reinforced resin materials.

The end surfaces of one or both bearings and the corresponding surfaces on the inner and outer members may be planar but more preferably the surfaces are of arcuate profile e.g. part-spherical. Where the bearing is of laminated construction the layers of elastomeric material and reinforcement material are preferably of arcuate profile similar to the end surfaces.

Where the end surfaces and, where provided, individual layers of a bearing are of arcuate profile they preferably have a common centre of curvature which preferably lies on the central longitudinal axis of the joint means. Where each bearing is so formed the respective common centres of curvature of the bearings may coincide or the common centre of curvature of one bearing may be displaced axially and/or radially relative to the common centre of curvature of the other bearing.

Equalization of the axial stiffnesses of the bearings may be effected in a number of ways, for example where both bearings include elastomeric material the latter may be selected so that the modulus of elasticity of the elastomeric material in one bearing is different to that of the elastomeric material in the other bearing. Furthermore the elastomeric material in a bearing may be selected so that the modulus of elasticity thereof is either constant or variable, for example the modulus of elasticity may vary from one layer to another and/or the modulus of elasticity may vary within a layer.

Where both bearings are of laminated construction the number of layers of elastomeric material and reinforcement material in one bearing may be different to that in the other bearing. Alternatively or in addition the relative spacing between the layers in one bearing may be different to that in the other bearing. Furthermore the relative spacing between the layers in a bearing may be constant or variable.

In a preferred construction the first bearing is positioned radially inwards of the second bearing, each bearing is of laminated construction comprising interleaving layers of elastomeric material and reinforcement material of part-spherical profile having a common centre of curvature lying on the central longitudinal axis of the joint means, the respective common centres of curvature of the bearings being coincident and the elastomeric material of the first bearing has a higher modulus of elasticity than the elastomeric material of the second bearing.

In addition to the first and second bearings having substantially similar axial stiffnesses it is preferred that they also have substantially similar radial stiffnesses and more preferably still that under conical deflection the shear strain levels generated in each bearing are substantially similar.

The flexible joint means may be used in fluid conduits in which both the inner and outer rigid members are formed with internal through bores for the passage of fluid. In such applications the flexible joint means may be used to provide a connection either between successive lengths of conduit or between an inlet or outlet point and a length of conduit.

The invention will now be described in more detail, by way of example only, with reference to the accompanying drawing which shows in axial cross-section one embodiment of joint means according to the present invention.

The joint means 1 shown in the accompanying drawing comprises a tubular outer member 2, a tubular inner member 3 having an end portion 4 positioned within the outer member and a bearing assembly 5 acting between the outer and inner members 2 and 3 respectively. In use of the joint means 1, inner member 3 is connected to the end of one of two fluid conduits (not shown) to be connected and outer member 2 is connected to the end of the other conduit (not shown) by any of suitable means.

The bearing assembly 5 includes first and second annular flexible bearings 6 and 7 respectively each comprising a plurality of interleaving layers of elastomeric material 6a, 7a, e.g. nitrile rubber, and inextensible reinforcement material 6b, 7b, e.g. steel.

The layers 6a,6b and 7a,7b of the bearings 6 and 7 respectively are of part-spherical profile when viewed in radial section and have a common centre of curvature 8 which lies on the central longitudinal axis L of the joint means. The bearings 6 and 7 are disposed on opposite sides of a radially outwardly extending annular collar 9 integral with the end portion 4 of inner member 3 and inclined at an acute angle to the longitudinal axis L of the joint means 1. The radially outermost and radially innermost elastomeric layers of bearings 6 and 7 respectively are bonded to the radially inwardly and outwardly facing surfaces 9a and 9b respectively of collar 9. Surfaces 9a and 9b are of part-spherical profile having the same centre of curvature as the individual layers forming the bearings 6 and 7.

The radially innermost and radially outermost elastomeric layers of bearings 6 and 7 respectively are bonded to the radially outwardly and radially inwardly facing surfaces 10a and 11a respectively of annular flanges 10 and 11. Surfaces 10a and 11a are of part-spherical profile having the same centre of curvature as the individual layers forming the bearings 6 and 7.

Flange 10 has an annular axial projection 12 formed with a plurality of circumferentially spaced axially extending holes 12a. Each hole 12a is internally threaded to receive a respective externally threaded bolt (not shown) to secure flange 10 to outer member 2.

Flange 11 has an annular radial projection 13 formed with a plurality of circumferentially spaced axially extending apertures 13a. A respective bolt (not shown) is inserted through each aperture 13a to secure flange 11 to outer member 2.

An annular ring 14 of elastomeric material, resistant to the fluid to be transported through the conduits connected by the joint means is bonded to collar 9, the radially inner side surface of the bearing 6 and flange 10. Ring 14 has an internal diameter similar to the internal diameters of the end portion 4 of inner member 3 and flange 10 so as to provide the joint means with a smooth internal bore of uniform cross-section which assists fluid flow through the joint means 1.

As above described bearing assembly 5, including inner member 3 and flanges 10 and 11, is formed as an integral fully bonded unit which is releasably secured to outer member 2 thereby facilitating assembly and subsequent maintenance of the joint means.

In operation axial loads applied to inner member 3 in the direction of arrow A or to outer member 2 in the direction of arrow B are accommodated by bearing 7 in compression simultaneously subjecting bearing 6 to increased tensile loads. Axial loads applied to inner member 3 in the direction of arrow B or to outer member 2 in the direction of arrow A are accommodated by bearing 6 in compression, simultaneously subjecting bearing 7 to increased tensile loads. To prevent either bearing being subjected to an overall tensile load under axially applied loads to either the inner or outer members the bearings 6 and 7 are constructed so as to be pre-loaded in compression on assembly. The degree of precompression is selected so that, under axial loading, causing an increased tensile loading of either bearing 6 or bearing 7 the elastomeric material remains in compression.

Furthermore in accordance with the present invention bearings 6 and 7 are constructed and arranged to have substantially equal axial stiffnesses so that the joint means is capable of withstanding high axial loads applied to either the inner or outer members in either the direction of arrow A or arrow B.

In the above described construction of joint means equalization of the axial stiffness of the bearings 6 and 7 is achieved by (a) forming the elastomeric layers 6a of the radially inner of the two bearings from elastomeric material having a higher modulus of elasticity than the elastomeric material forming the layers 7a of the radially outer bearing (b) providing a greater number of metal reinforcement plates 6b in the radially inner of the two bearings than in the radially outer bearing (nine metal plates 6b as opposed to six metal plates 7b) and (c) reducing the thickness of the elastomeric layers 6a between the metal reinforcement plates 6b in the bearing 6 as compared with the thickness of the elastomeric layers 7a between the metal reinforcement plates 7b in the bearing 7.

In each of the bearings 6 and 7 the modulus of elasticity of the elastomeric material forming the layers 6a and 7a is constant throughout the bearing and the thickness of the layers 6a and 7a is also constant throughout the bearing. However, in alternative constructions these values may not be constant but may be varied in a controlled manner to provide the required equalization of axial stiffnesses.

Having now described my invention, what I claim is:

1. Flexible joint means comprising a rigid outer member having an end portion defining an opening therein, first and second radially inwardly extending annular flanges associated with said outer member, said flanges being spaced relative to one another along the longitudinal axis of said joint means, a rigid inner member having an end portion positioned within said opening in said outer member, a radially outwardly extending annular collar associated with said inner member, said collar being positioned between said first and second flanges, a first annular elastomeric bearing acting between a radially outwardly facing surface of said first flange and a radially inwardly facing surface of said collar, a second annular elastomeric bearing acting between a radially outwardly facing surface of said collar and a radially inwardly facing surface of said second flange such that said first bearing is positioned radially inwards of said second bearing and said first and second bearings are constructed to have substantially similar axial stiffnesses, and said elastomeric material of said first bearing has a higher modulus of elasticity than said elastomeric material of said second, radially outer, bearing.

2. Joint means according to claim 1 wherein at least one of said first and second bearings is of laminated construction comprising interleaving layers of elastomeric material, e.g. rubber, and reinforcement material e.g. metal, fabric, fibreglass, reinforced plastics and fibre reinforced resin materials.

3. Joint means according to claim 2 wherein said individual layers of said one bearing are curved.

4. Joint means according to claim 3 wherein said curved layers are part-spherical.

5. Joint means according to claim 3 wherein said curved layers have a common centre of curvature.

6. Joint means according to claim 5 wherein said common centre of curvature lies on the longitudinal axis of said joint means.

7. Joint means according to claim 4 wherein both said first and second bearings are of laminated construction comprising interleaving layers of elastomeric material e.g. rubber and reinforcement material e.g. metal, fabric, fibreglass reinforced plastics and fibre reinforced resin materials.

8. Joint means according to claim 7 wherein said individual layers of each of said first and second bearings are of curved part-spherical profile having a common centre of curvature and the respective common centres of curvature of said first and second bearings are coincident on the longitudinal axis of said joint means.

9. Flexible joint means comprising a rigid outer member having an end portion defining an opening therein, first and second radially inwardly extending annular flanges associated with said outer member, said flanges being spaced relative to one another along the longitudinal axis of said joint means, a rigid inner member having an end portion positioned within said opening in said outer member, a radially outwardly extending annular collar associated with said inner member, said collar being positioned between said first and second flanges, a first annular elastomeric bearing acting between a radially outwardly facing surface of said first flange and a radially inwardly facing surface of said collar, a second annular elastomeric bearing acting between a radially outwardly facing surface of said collar and a radially inwardly facing surface of said second flange such that said first bearing is positioned radially inwards of said second bearing and said first and second bearings are constructed to have substantially similar axial stiffness with both of said first and second bearings being of curved, part-spherical laminated construction comprising interleaving layers of elastomeric material, e.g. rubber, and reinforcement material e.g. metal, fabric, fibre-glass, reinforced plastics and fibre reinforced resin materials and the number of reinforcement layers in said first bearing exceeds that in said second bearing and the thickness of said elastomeric layers in said first bearing is less than that in said second bearing.

10. Flexible joint means comprising a rigid outer member having an end portion defining an opening therein, first and second radially inwardly extending annular flanges associated with said outer member, said flanges being spaced relative to one another along the longitudinal axis of said joint means, a rigid inner member having an end portion positioned within said opening in said outer member, a radially outwardly extending annular collar associated with said inner member, said collar being positioned between said first and second flanges, a first annular elastomeric bearing acting between a radially outwardly facing surface of said first flange and a radially inwardly facing surface of said collar, a second annular elastomeric bearing acting between a radially outwardly facing surface of said collar and a radially inwardly facing surface of said second flange such that said first bearing is positioned radially inwards of said second bearing and said first and second bearings are constructed to have substantially similar axial stiffnesses with both of said first and second bearings being of curved, part-spherical laminated constructed comprising interleaving layers of elastomeric material, e.g. rubber, and reinforcement material e.g. metal, fabric, fibre-glass, reinforced plastics and fibre reinforced resin materials and the modulus of elasticity of said elastomeric material in said first bearing and/or said second bearing varies from one end of said bearing to the other end.

11. Flexible joint means comprising a rigid outer member having an end portion defining an opening therein, first and second radially inwardly extending annular flanges associated with said outer member, said flanges being spaced relative to one another along the longitudinal axis of said joint means, a rigid inner member having an end portion positioned within said opening in said outer member, a radially outwardly extending annular collar associated with said inner member, said collar being positioned between said first and second flanges, a first annular elastomeric bearing acting between a radially outwardly facing surface of said first flange and a radially inwardly facing surface of said collar, a second annular elastomeric bearing acting between a radially outwardly facing surface of said collar and a radially inwardly facing surface of said second flange such that said first bearing is positioned radially inwards of said second bearing and said first and second bearings are constructed to have substantially similar axial stiffnesses with both of said first and second bearings being of curved, part-spherical laminated constructed comprising interleaving layers of elastomeric material, e.g. rubber, and reinforcement material e.g. metal, fabric, fibre-glass, reinforced plastics and fibre reinforced resin materials and the modulus of elasticity of one or more layers of elastomeric material in said first bearing and/or said second bearing varies within the or each layer.

12. Joint means according to claim 1 wherein said first and second bearings have substantially similar radial stiffnesses.

13. Joint means according to claim 1 wherein said first and second bearings are constructed and arranged such that under conical deflection the shear strain levels generated in each bearing are substantially similar.

14. Flexible joint means comprising a rigid outer member having an end portion defining an opening therein, first and second radially inwardly extending annular flanges associated with said outer member, said flanges being spaced relative to one another along the longitudinal axis of said joint means, a rigid inner member having an end portion positioned within said opening in said outer member, a radially outwardly extending annular collar associated with said inner member, said collar being positioned between said first and second flanges, and first and second flexible annular bearings of elastomeric material disposed on opposite sides of said collar and extending between said collar and said flanges so that in operation of said joint means one bearing is subjected to axial compression loads while said other bearing is subjected to axial tension loads, said first and second bearings are constructed and arranged to have substantially similar axial stiffnesses, said first bearing is positioned radially inwards of said second bearing and elastomeric material of said first bearing has a higher modulus of elasticity than elastomeric material of said second bearing.

15. Flexible joint means comprising a rigid outer member having an end portion defining an opening therein, first and second radially inwardly extending annular flanges associated with said outer member, said flanges being spaced relative to one another along the longitudinal axis of said joint means, a rigid inner member having an end portion positioned within said opening in said outer member, a radially outwardly extending annular collar associated with said inner member, said collar being positioned between said first and second flanges, a first annular elastomeric bearing acting between a radially outwardly facing surface of said first flange and a radially inwardly facing surface of said collar, a second annular elastomeric bearing acting between a radially outwardly facing surface of said collar and a radially inwardly facing surface of said second flange such that said first bearing is positioned radially inwards of said second bearing, said first and second bearings are constructed to have substantially similar axial stiffnesses, each elastomeric bearing being of laminated construction comprising interleaving layers of elastomeric material and reinforcement material of curved profile, said curved layers having a common centre of curvature which lies on the longitudinal axis of said joint means and the elastomeric material of said first bearing has a higher modulus of elasticity than said elastomeric material of said second, radially outer, bearing.

16. The flexible joint means of claim 1 wherein the radially inner side surface of the first annular elastomeric bearing has bonded thereto and is covered by an annular ring of elastomeric material.

17. The flexible joint means of claim 16 wherein said annular ring of elastomeric material is bonded to said collar and said first flange.

18. The flexible joint means of claim 16 wherein said annular ring of elastomeric material provides the joint means with a smooth internal bore between the collar and the first flange.

19. The flexible joint means of claim 18 wherein said annular ring of elastomeric material provides the joint means with a smooth internal bore between the collar and the first flange.

20. The flexible joint means of claim 9 wherein the radially inner side surface of the first annular elastomeric bearing has bonded thereto and is covered by an annular ring of elastomeric material.

21. The flexible joint means of claim 10 wherein the radially inner side surface of the first annular elastomeric bearing has bonded thereto and is covered by an annular ring of elastomeric material.

22. The flexible joint means of claim 11 wherein the radially inner side surface of the first annular elastomeric bearing has bonded thereto and is covered by an annular ring of elastomeric material.

23. The flexible joint means of claim 14 wherein the radially inner side surface of the first annular elastomeric bearing has bonded thereto and is covered by an annular ring of elastomeric material.

24. The flexible joint means of claim 15 wherein said annular ring of elastomeric material is bonded to said collar and said first flange.

* * * * *